(12) United States Patent
Louie et al.

(10) Patent No.: US 11,597,167 B2
(45) Date of Patent: Mar. 7, 2023

(54) CONTINUOUS-LINE FABRICATION FOR COMPOSITE PARTS

(71) Applicant: The Boeing Company, Chicago, IL (US)

(72) Inventors: Michael Kenneth-Que Louie, Renton, WA (US); Jordan Seth Erickson, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/454,259

(22) Filed: Nov. 10, 2021

(65) Prior Publication Data
US 2022/0152943 A1 May 19, 2022

Related U.S. Application Data

(60) Provisional application No. 63/115,034, filed on Nov. 18, 2020.

(51) Int. Cl.
*B29C 70/54* (2006.01)
*B29C 70/32* (2006.01)

(52) U.S. Cl.
CPC ............. *B29C 70/32* (2013.01); *B29C 70/54* (2013.01)

(58) Field of Classification Search
CPC ...... B29C 70/54; B29C 70/386; B29C 70/388
See application file for complete search history.

(56) References Cited

U.S. PATENT DOCUMENTS

| | | | | |
|---|---|---|---|---|
| 4,133,711 A | * | 1/1979 | August | B29C 70/545 156/367 |
| 2002/0059976 A1 | * | 5/2002 | Taggart | B29C 70/46 296/900 |
| 2005/0039843 A1 | * | 2/2005 | Johnson | B29C 70/386 156/425 |
| 2013/0032287 A1 | * | 2/2013 | Hagman | B29C 70/388 156/530 |

FOREIGN PATENT DOCUMENTS

EP 3653369 A1 5/2020

OTHER PUBLICATIONS

Netherlands Patent Office Written Opinion and Search Report with English Translation, dated Jul. 9, 2021, regarding Application No. NL2027424, 8 pages.

* cited by examiner

*Primary Examiner* — Jeffry H Aftergut
(74) *Attorney, Agent, or Firm* — Yee & Associates, P.C.

(57) ABSTRACT

Systems and methods are provided for forming a laminate. The method includes indexing a layup mandrel to a lamination machine disposed at a first location, transporting the lamination machine and the layup mandrel in a process direction from the first location towards a second location, laying up a laminate comprising layers of fiber-reinforced material onto the layup mandrel via the lamination machine while the lamination machine and the layup mandrel are transported in the process direction, removing the layup mandrel and the laminate at the second location, and returning the lamination machine to the first location for laying up another laminate onto another mandrel.

28 Claims, 10 Drawing Sheets

US 11,597,167 B2

CONTINUOUS-LINE FABRICATION FOR COMPOSITE PARTS

CROSS-REFERENCE TO RELATED APPLICATION

This application claims the benefit of U.S. Provisional Patent Application Ser. No. 63/115,034, filed Nov. 18, 2020, and entitled "Continuous-Line Fabrication for Composite Parts;" which is incorporated herein by reference in its entirety.

FIELD

The disclosure relates to the field of fabrication, and in particular, to fabrication of composite parts.

BACKGROUND

Multi-layer laminates of constituent material (e.g., Carbon Fiber Reinforced Polymer (CFRP)) may be formed into any of a variety of shapes for hardening into a composite part. To facilitate the fabrication of composite parts, a robot such as an Automated Fiber Placement (AFP) machine may be utilized. For example, a large (e.g., multi-ton) AFP machine may occupy a cell, wherein the AFP machine lays up one or more layers of tows of constituent material that form a laminate which is then cured.

Fabrication of a composite part remains time consuming, however, because individual operations such as layup, consolidation, bagging, and curing are performed at different cells within the fabrication environment, and technicians must physically transport laminates on carts before proceeding with a next step of the fabrication process in another cell.

Therefore, it would be desirable to have a method and system that take into account at least some of the issues discussed above, as well as other possible issues.

SUMMARY

Embodiments described herein provide for lamination machines that actively lay up a laminate while a mandrel for the laminate (and the lamination machine itself) is being transported. This provides twin benefits of layup and transportation within a single station, and enables laminates to be fabricated as part of a continuous, moving line process. This arrangement also breaks down fabrication work into smaller portions, and enables immediate detection and response to out-of-tolerance conditions encountered during layup.

One embodiment is a method for forming a laminate. The method includes indexing a layup mandrel to a lamination station disposed at a first location, transporting the lamination station and the layup mandrel in a process direction from the first location towards a second location, laying up the laminate having layers of fiber-reinforced material onto the layup mandrel via a lamination machine while the lamination machine and the layup mandrel are transported in the process direction, removing the layup mandrel and the laminate at the second location, and returning the lamination station to the first location for laying up another laminate onto another mandrel.

A further embodiment is a non-transitory computer readable medium embodying programmed instructions which, when executed by a processor, are operable for performing a method for forming a laminate. The method includes indexing a layup mandrel to a lamination station disposed at a first location, transporting the lamination station and the layup mandrel in a process direction from the first location towards a second location, laying up the laminate having layers of fiber-reinforced material onto the layup mandrel via a lamination machine while the lamination machine and the layup mandrel are transported in the process direction, removing the layup mandrel and the laminate at the second location, and returning the lamination station to the first location for laying up another laminate onto another mandrel.

A further embodiment is a system for forming a laminate having multiple layers of fiber-reinforced material. The system includes a lamination station includes a layup mandrel having mandrel indexing elements. The lamination system further includes a shuttle having shuttle indexing elements for engaging the mandrel indexing elements of the layup mandrel. The lamination station further includes a lamination machine attached to the shuttle, and the lamination system further includes a drive system that transports the shuttle in a process direction while the lamination machine lays up the layers of the laminate onto the layup mandrel.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as CFRP parts, are initially laid-up in multiple layers that together are referred to as a laminate or "preform." Individual fibers within each layer of the laminate are aligned parallel with each other, but different layers may exhibit different fiber orientations in order to increase the strength of the resulting composite part along different dimensions. The laminate may include a viscous resin that solidifies in order to harden the laminate into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated.

Figure 1:
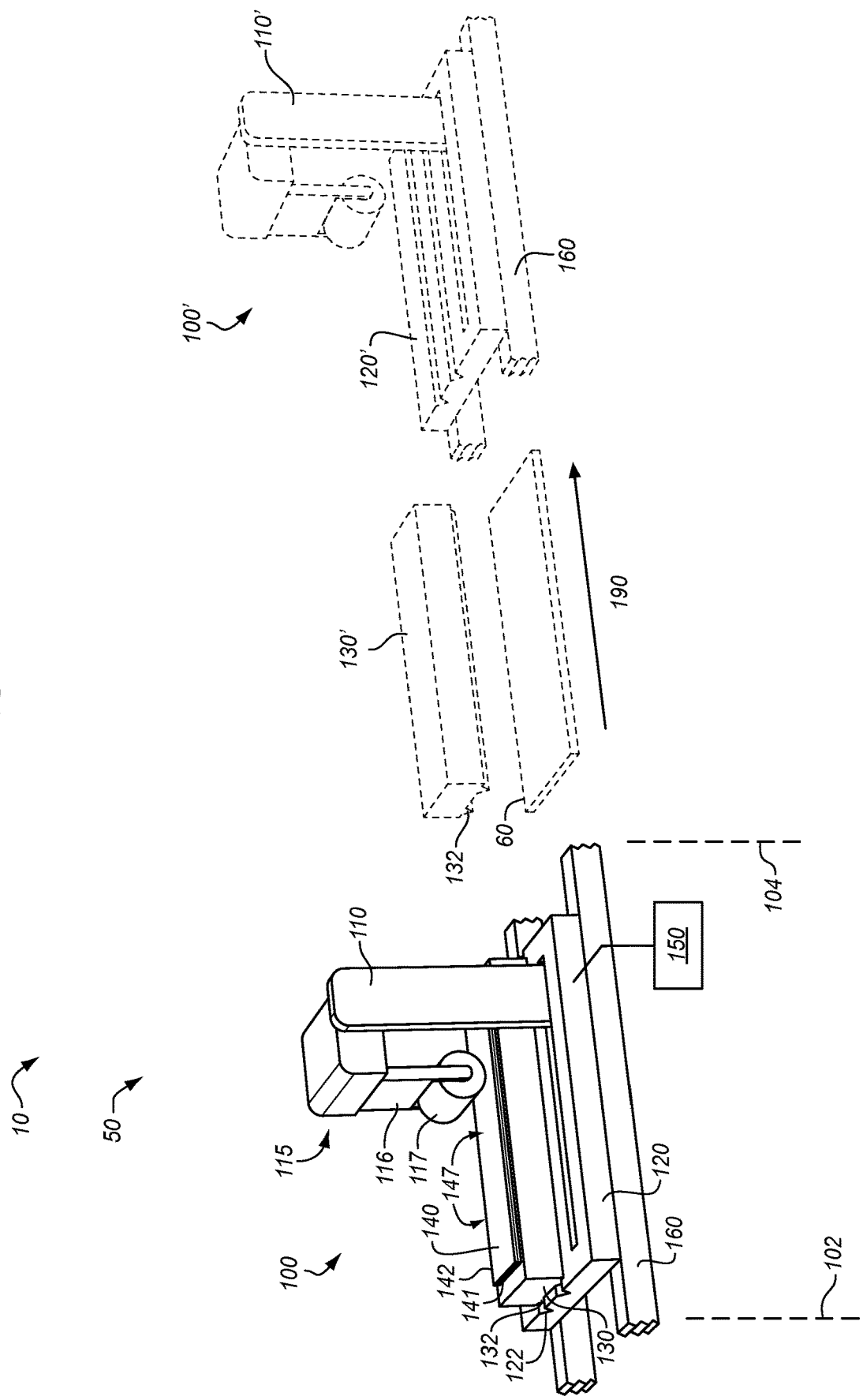
FIG. 1 is a schematic diagram of a lamination system in an illustrative embodiment.

FIG. 1 is a schematic diagram of a lamination system 50 for use within a manufacturing line 10. The lamination system 50 can be one system in a series of systems that make up the manufacturing line 10. For example, the manufacturing line 10 can further include a fastener installation system positioned after the lamination system 50. The lamination system 50, and more specifically the lamination station 100, is used to form a laminate 140. The laminate 140 includes at least a first layer 141 and a second layer 142 of fiber-reinforced material 147.

The lamination system 50 has a lamination station 100 and a layup mandrel 130. The lamination system 50 can include more than one lamination station 100 such that a first lamination station 100 and a second lamination station 100' are in series along a process direction 190 of the manufacturing line 10. In such an embodiment, the lamination system 50 further includes a transfer machine 60 that can move between the lamination stations 100, 100' of the lamination system 50. The transfer machine 60 is configured to remain stationary during transfer of the layup mandrel 130, as described in more detail with respect to FIG. 7.

Referring still to FIG. 1, the lamination system 50 further includes a drive system 150. The drive system 150 moves the lamination station 100 and/or the layup mandrel 130 to perform the methods described herein. More specifically, the drive system 150 moves the lamination station 100 from a first location 102 to or toward a second location 104 along the process direction 190. In the examples described herein, the drive system 150 moves the shuttle 120 of the lamination station 100 from the first location 102 toward the second location 104. The lamination system 50 can further include a track system 160. When the lamination system 50 includes the track system 160, the drive system 150 moves the lamination station 100 and/or the layup mandrel 130 along the track system 160 at least from the first location 102 toward the second location 104. Further, the drive system 150 can include an electrified/powered rail 162. The powered rail 162 can be integrated into a track on the track system 160 or can be separate from the tracks of the track system. When the powered rail 162 is included in the lamination system 50, the drive system 150 moves the shuttle 120 along the powered rail 162 to transport the lamination station 100.

Further, the lamination system 50 can include more than one layup mandrel 130, such as including the layup mandrel 130 and a new layup mandrel 130'. The layup mandrels 130, 130' can be used within the same lamination station 100 or can each be used with a respective lamination station 100, 100'. The layup mandrel 130 includes mandrel indexing elements 132, as will be explained in more detail below. When the lamination system 50 includes more than one layup mandrel 130, 130', each layup mandrel 130, 130' includes the mandrel indexing elements 132.

Figure 2:
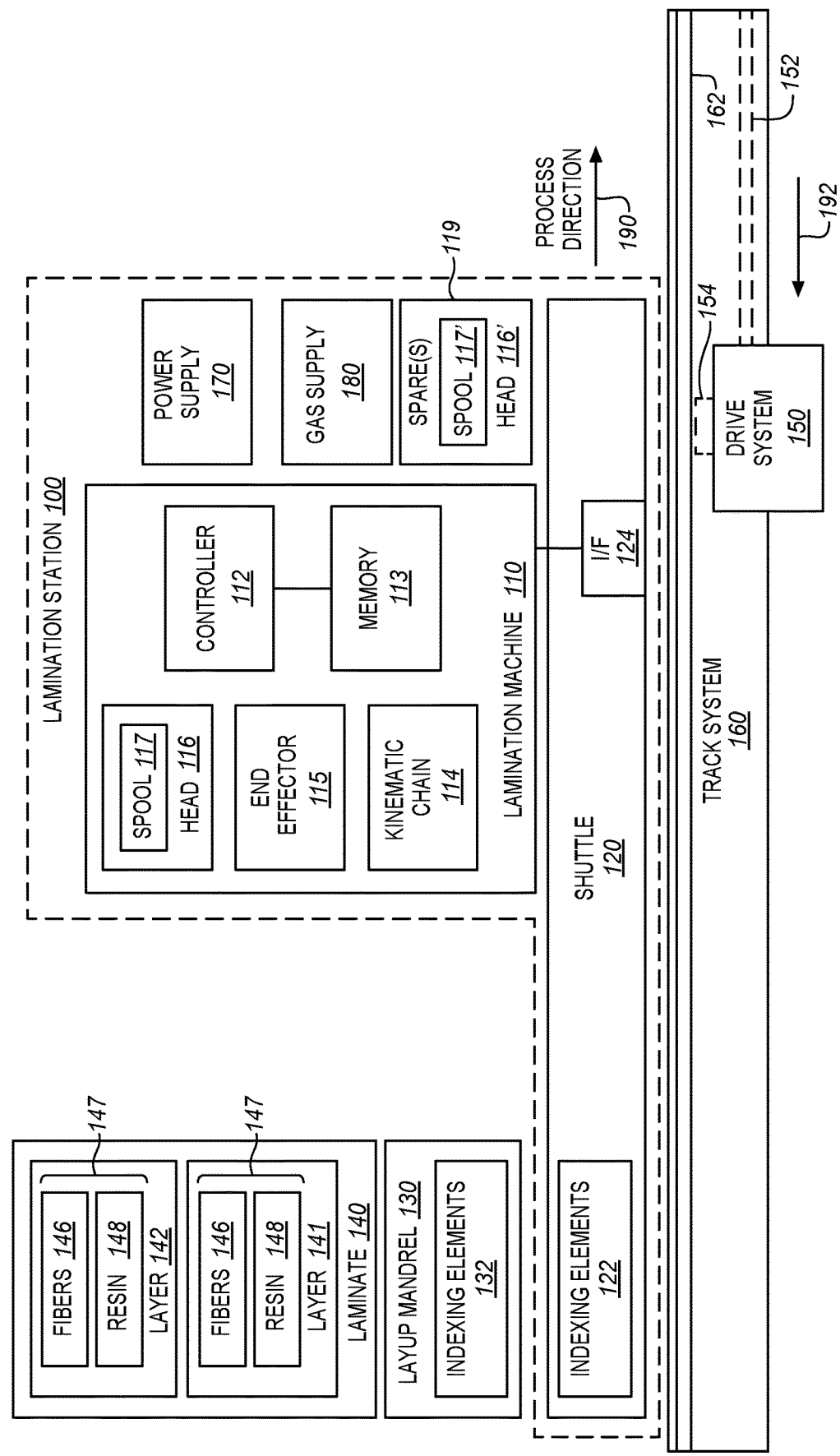
FIG. 2 is a schematic block diagram of a lamination station that can be used with the lamination system shown in FIG. 1.

FIG. 2 is a schematic block diagram of the lamination station 100 than can be used in the lamination system 50. Lamination station 100 comprises any system, device, or component operable lay up a laminate 140 onto the layup mandrel 130 while the layup mandrel 130 is moving continuously in the process direction 190. As described in more detail with respect to FIGS. 5, 6, and 8, the lamination station 100 can also move in a counter process direction 192 through the lamination system 50. Referring to FIG. 2, the lamination station 100 includes a shuttle 120 and a lamination machine 110. In this embodiment, the lamination station 100 is associated with the track system 160 along which a shuttle 120 is transported by the drive system 150. The drive system 150 can include a chain drive 152 that is coupled with the track system 160 or an engine 154 that moves along the track system 160. In such embodiments, power may be provided to the shuttle 120 (e.g., a platen, vacuum platen, flat surface, etc.) (or the engine 154 that drives shuttle 120) via the electrified or powered rail 162 of the track system 160. In still further embodiments, shuttle 120 is transported by an Autonomous Guided Vehicle (AGV) or other automated device acting as the drive system 150, and the track system 160 is not used. The shuttle 120 includes shuttle indexing elements 122, such as cups of a cup-and-cone indexing system.

Figure 4:
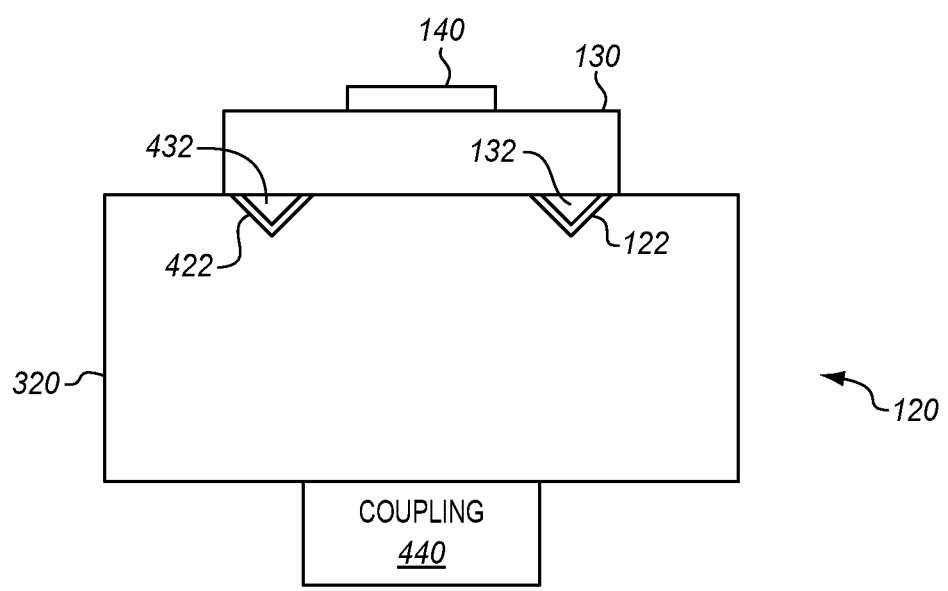
FIG. 4 is a section cut side view of the shuttle of FIG. 3 in an illustrative embodiment.

Shuttle indexing elements 122 enable the layup mandrel 130 to be removably placed at shuttle 120 at a known offset from the lamination machine 110. The layup mandrel 130 includes mandrel indexing elements 132, which are complementary to shuttle indexing elements 122. The shuttle indexing elements 122 are configured to engage, such as receive, the mandrel indexing elements 132. The engagement of the shuttle indexing elements 122 and the mandrel indexing elements 132 align the layup mandrel 130 to the shuttle 120. For example, in an embodiment as shown in FIG. 4 where the shuttle indexing elements 122 are cups, the mandrel indexing elements 132 are cones having a shape complementary to a shape of the cups. This enables indexing the layup mandrel 130 to the shuttle 120 via complementary indexing elements disposed at the layup mandrel 130 and the shuttle 120.

The lamination machine 110 is disposed on/affixed to the shuttle 120, which is driven in the process direction 190. Lamination machine 110 lays up the laminate 140 having layers 141, 142 of a fiber-reinforced material 147 including resin 148 reinforced by fibers 146. In one embodiment, each layer 141, 142 laid-up by the lamination machine 110 includes a tow of unidirectional fiber-reinforced polymer. The lamination machine 110 includes an end effector 115. The end effector 115 can be driven by a kinematic chain 114. In some embodiments, the kinematic chain 114 and the end effector 115 are a robot arm. The end effector 115 includes a head 116, which is capable of dispensing fiber-reinforced material 147 stored in a spool 117 at desired fiber orientations (e.g., zero degrees, plus forty-five degrees, minus forty-five degrees, and ninety degrees).

The lamination machine 110 further includes a controller 112 and a memory 113. The controller 112 operates the kinematic chain 114 to control the movements of the end effector 115, according to instructions stored in a Numerical Control (NC) program in the memory 113. Upon depletion of the fiber-reinforced material 147 from the spool 117, the controller 112 operates the kinematic chain 114 and the end effector 115 to remove the head 116 and acquire a spare 119 of spare head 116' and/or to remove the spool 117 and replace the spool 117 with a spare spool 117' that is fully loaded with fiber-reinforced material 147. The spare(s) 119 (e.g., spare head 116', spare spool 117') may be stored on the shuttle 120, on a second shuttle 120', or at a known location along the track system 160. The controller 112 may be implemented, for example, as custom circuitry, as a hardware processor executing programmed instructions, or some combination thereof.

In further embodiments, a power supply 170 and/or a gas supply 180 are disposed upon the shuttle 120 for powering and supplying pressurized gas to the lamination machine 110. In still further embodiments, the shuttle 120 includes an interface (I/F) 124 that couples with the powered rail 162 of the drive system 150. The interface 124 is configured to acquire power from the electrified/powered rail 162 of the track system 160. That is, the interface 124 couples with the powered rail 162 along which the drive system 150 transports the shuttle 120 to deliver power to shuttle 120 of components thereon, such as delivering power to the lamination machine 110 on the shuttle 120.

During operation, the layup mandrel 130 is loaded onto the shuttle 120, and the shuttle 120 moves in the process direction 190 while lamination machine 110 lays up the laminate 140 on the layup mandrel 130. The layup mandrel 130 (and the laminate 140) then proceed to second lamination station 100' in the lamination system 50 or to another system in the manufacturing line 10 (show in FIG. 1) for additional lamination (if needed), to be consolidated, bagged, and cured, or otherwise prepared for fabrication into a composite part.

Figure 3:
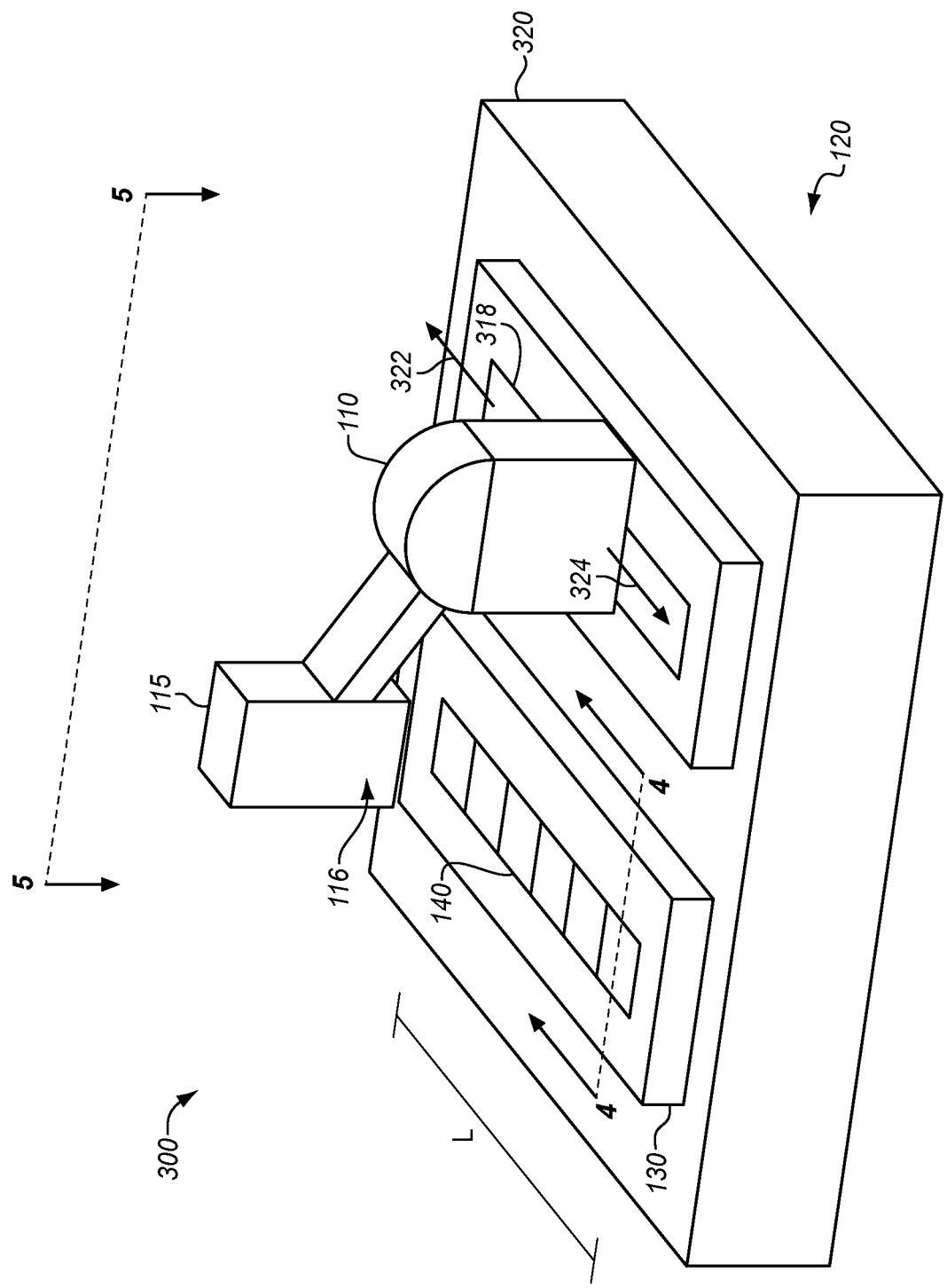
FIG. 3 is a perspective view of a shuttle carrying a lamination machine and a mandrel that can be used with the lamination stations shown in FIGS. 1 and 2.

FIG. 3 is a perspective view of the shuttle 120 carrying the lamination machine 110 and the layup mandrel 130 in an illustrative embodiment. In this embodiment, the lamination machine 110 moves along path 318 attached to or defined in a body 320 of the shuttle 120. The path 318 enables the lamination machine 110 to move a first direction 322 that is the same as the process direction 190 or in a second direction 324 opposite of the process direction 190. The lamination machine 110 can move either first direction 322 or second direction 324 in the path 318 regardless of which direction 190 or 192 the shuttle 120 is moving in. Accordingly, the lamination machine 110 can move in the first direction 322 to lay up the first layer 141 on the layup mandrel 130 and move in the second direction 324 to lay up the second layer 142 on the first layer 141. The lamination machine 110 can move back and forth in the path 318 to lay up the layers 141, 142 of the laminate 140 while the shuttle 120 moves in the process direction 190, the counter process direction 192, or is stationary.

For example, the lamination machine 110 moves along the path 318 during operation at the shuttle 120, which enables an end effector 115, such as the head 116 of the end effector 115, of the lamination machine 110 to lay up layers 141, 142, such as tows, of fiber-reinforced material 147 along a length L of a laminate 140. Body 320 of the shuttle 120 may be carried by the track system 160 (shown in FIGS. 1 and 2), driven by a tug platform along the track system 160, carried by an AGV, or otherwise transported between locations within the lamination station 100, lamination system 50, and/or manufacturing line 10. However, the possible variations of transportation of the shuttle 120 are not illustrated in FIG. 3 for the sake of brevity. This transportation process helps to facilitate handing-off of the laminate 140 between lamination stations 100, 100' that perform repetitive or different actions upon the laminate 140.

FIG. 4 is a section cut view of the shuttle 120 of FIG. 3 in an illustrative embodiment. FIG. 4 illustrates that the shuttle 120 includes a mechanical coupling 440 (e.g., a hook) for engaging with the drive system 150 (shown in FIG. 2), such as a chain drive, in order to be transported along the track system 160 (shown in FIGS. 1 and 2). FIG. 4 further illustrates that the layup mandrel 130 includes cones 432 as the mandrel indexing elements 132, and the shuttle 120 includes cups 422 as the shuttle indexing elements 122. The cones 432 engage with (i.e., receive) the cups 422 to facilitate indexing the layup mandrel 130 to the shuttle 120. The geometry of the shuttle indexing element 122 and mandrel indexing element 132 automatically aligns the layup mandrel 130 with the shuttle 120 when the layup mandrel 130 is placed at the shuttle 120 (so long as a tip of each cone 432 is placed anywhere within its corresponding cups 422). That is, the weight of the layup mandrel 130 pushes the layup mandrel 130 into place such that the cones 432 are centered on the cups 422 when the layup mandrel 130 is released.

Figure 5:
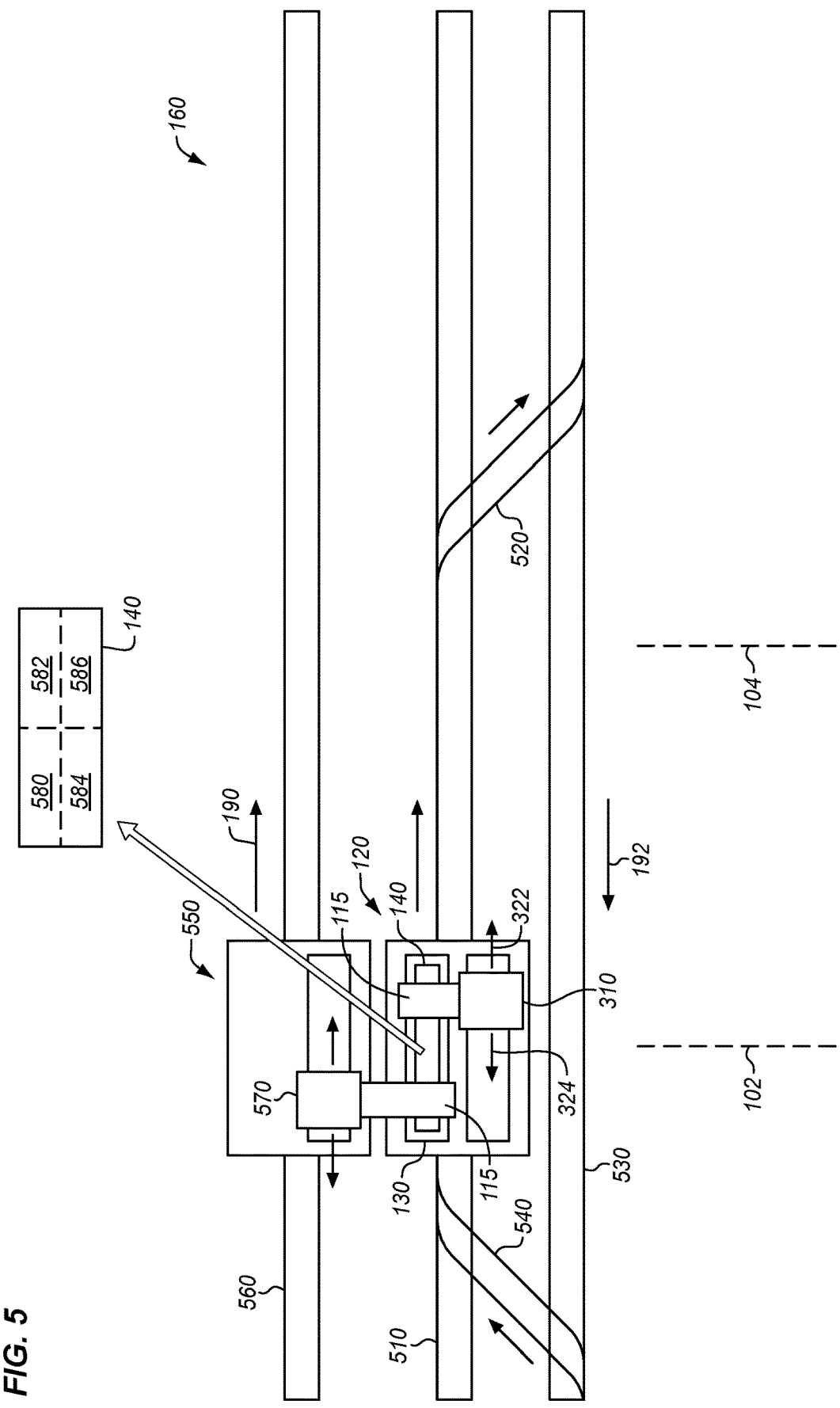
FIG. 5 is a top view of a lamination station that includes the shuttle of FIG. 3 in an illustrative embodiment.
Figure 6:
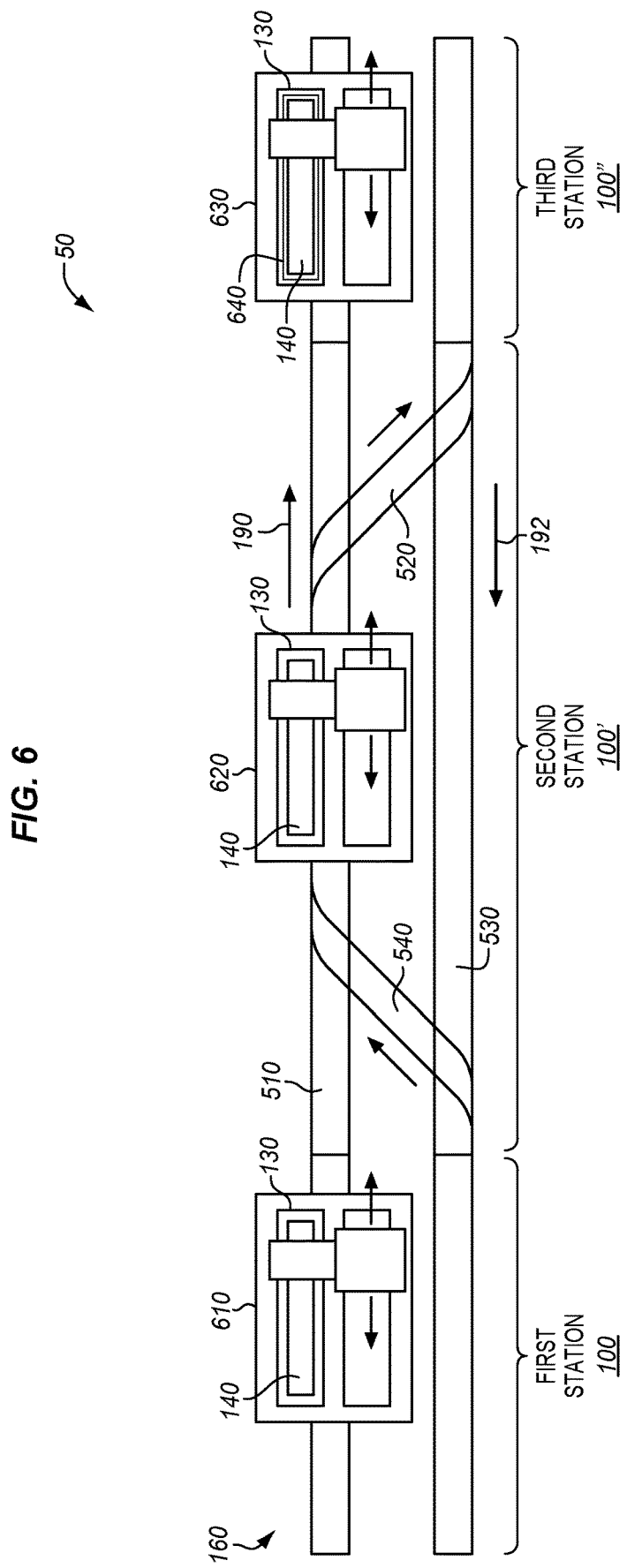
FIG. 6 is a top view of multiple lamination stations that interact with each other in an illustrative embodiment.

With a discussion of the design of the shuttle 120 and constituent components provided above with regard to FIGS. 3 and 4, further discussion in FIGS. 5 and 6 focuses upon the arrangement of the track system 160 and shuttles 120 within a lamination station 100 in a manner that facilitates fabrication processes.

FIG. 5 is a top view of the lamination station 100 that includes the shuttle 120 of FIG. 3 in an illustrative embodiment. As shown in FIG. 5, the track system 160 can include a first track 510, a second track 530, and a third track 560. The track system 160 further includes a first switch track 520 and a second switch track 540 extending between at least two tracks 510, 530 of the track system 160. In FIG. 5, the shuttle 120 traverses between the first track 510 and the second track 530 via the switch tracks 520 and 540. The lamination machine 110 performs layup while shuttle 120 proceeds along the first track 510. The lamination machine 110 may be recharged, restocked, or otherwise replenished before proceeding via the first switch track 520 and the second track 530 to receive another mandrel (e.g., the new layup mandrel 130' shown in FIG. 1) for layup. Upon reaching the first switch track 520, the lamination machine 110 may be disconnected from umbilicals or other components that provide power and pressurized gas to the lamination machine 110. In further embodiments, however, the lamination machine 110 is powered by self-contained power and pressure sources within or on the shuttle 120, such as the power supply 170 and/or the gas supply 180.

During operation as the layup mandrel 130 proceeds in the process direction 190 atop the shuttle 120, a second shuttle 550 is transported across the third track 560 at the same rate as the shuttle 120 is transported across the first track 510. A second lamination machine 570 at the second shuttle 550 proceeds to perform layup in tandem with the lamination machine 110. For example, both of these lamination machines 110, 570 may be operated according to the same NC program.

In short, as shown in FIG. 5, fabrication processes can include transporting an additional, second lamination machine 570 in the process direction 190 from a first location 102 towards a second location 104, and laying up the laminate 140 can be performed via coordinated action of the lamination machine 110 and the additional, second lamination machine 570. In such circumstances, the fabrication rate is increased by the use of two of end effector 115 (e.g., the heads 116 of the end effectors 115) working to build the laminate 140 simultaneously. In this manner, multiple lamination machines 110, 570 may be operated simultaneously to apply the layers 141, 142 of fiber-reinforced material 147 (shown in FIGS. 1 and 2) onto the same layup mandrel 130. For example, the lamination machine 110 lays up the first layer 141 on to the layup mandrel 130, and the second lamination machine 570 follows the lamination machine 110 to lay up the second layer 142 on to the first layer 141 to form the laminate 140.

The embodiment in FIG. 5 also allows the lamination system 50 to form at least two different portions 580, 582, 584, 586 of the laminate 140 simultaneously using different lamination machines 110, 570 at the same lamination station 100. Alternatively, the different portions 580, 582, 584, 586 of the laminate 140 can be simultaneously formed by different lamination machines 110, 110' in different lamination stations 100, 100'. In the example shown in FIG. 5, the first lamination machine 110 forms a first axial portion 582/586 of the laminate 140, and the second lamination machine 570 forms a second axial portion 580/584 of the laminate 140. Alternatively, the first lamination machine 110 forms a first longitudinal portion 584/586 of the laminate 140, and the second lamination machine 570 forms a second longitudinal portion 580/582 of the laminate 140. The portions 580, 582, 584, and/or 586 can also be individual layers or subsets of layers that make up the laminate 140.

FIG. 6 is a top view of the lamination system 50 having multiple lamination stations 100, 100', 100" that interact with each other in an illustrative embodiment. The lamination stations 100, 100', 100" may interact with each other to hand-off laminates 140 (or hardened composite parts) in order to perform different tasks, such as lamination, consolidation, bagging, curing, etc., as the layup mandrel 130 is transported (e.g., along the track system 160) in the process direction 190. Each lamination station 100, 100', 100" can be configured similarly (e.g., has the same components), as described with respect to FIGS. 1 to 4. However, in the embodiment of FIG. 6, each lamination station 100 is slightly differently configured. For example, a first lamination station 100 is a lamination station 610 as described above, a second lamination station 100' is a consolidation station 620, and a third lamination station 100" is a bagging station 630.

In the embodiment of FIG. 6, the first lamination station 610 lays up the laminate 140 on to the layup mandrel 130, and the second consolidation station 620 receives the laminate 140 by picking up the layup mandrel 130 from the first lamination station 100 and consolidates the laminate 140. The third bagging station 630 receives the consolidated laminate 140 by picking up the layup mandrel 130 and applies a vacuum bag 640 atop the consolidated laminate 140. The layup mandrel 130 may then be moved to a heater (e.g., an autoclave) and hardened.

Figure 7:
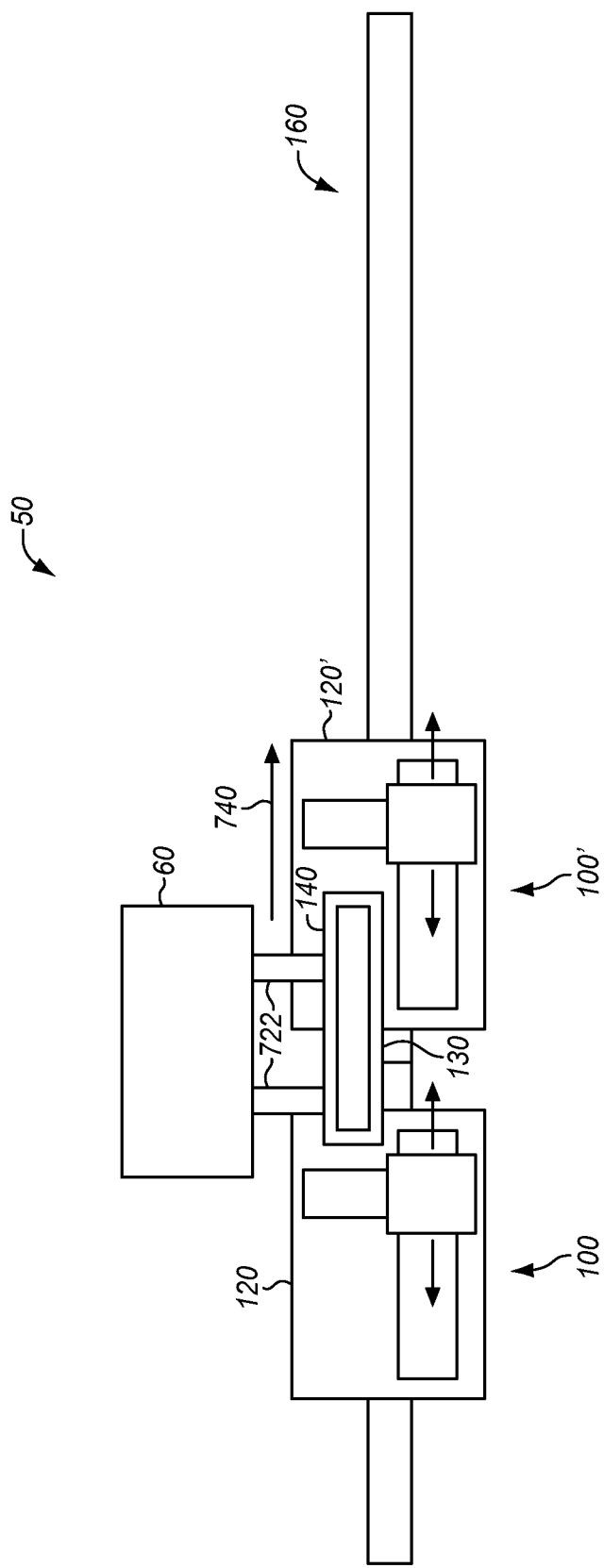
FIG. 7 is a top view of a transfer of a mandrel between the lamination stations of FIG. 6 in an illustrative embodiment.

FIG. 7 is a top view of a transfer of the layup mandrel 130 between lamination stations 100, 100' using the transfer machine 60. In the illustrative embodiment of FIG. 7, the transfer machine 60 transfers the layup mandrel 130 between the shuttle 120 of the first lamination station 100 and a second shuttle 120' of the second lamination station 100'. According to FIG. 7, the transfer machine 60 is stationary while the shuttles 120, 120' move with respect to the transfer machine 60 to transfer the layup mandrel 130 between shuttles 120 and 120'. The transfer machine 60 has arms 722 that can be inserted into the layup mandrel 130, and moves the arms 722 in a transfer direction 740. The transfer direction 740 can be the same as the process direction 190; however, the transfer direction 740 can be opposite the process direction 190. This transfers the layup mandrel 130 from the shuttle 120 on the left, first lamination station 100 to a second shuttle 120' on the right, second lamination station 100' for continuing layup of the laminate 140.

Figure 8:
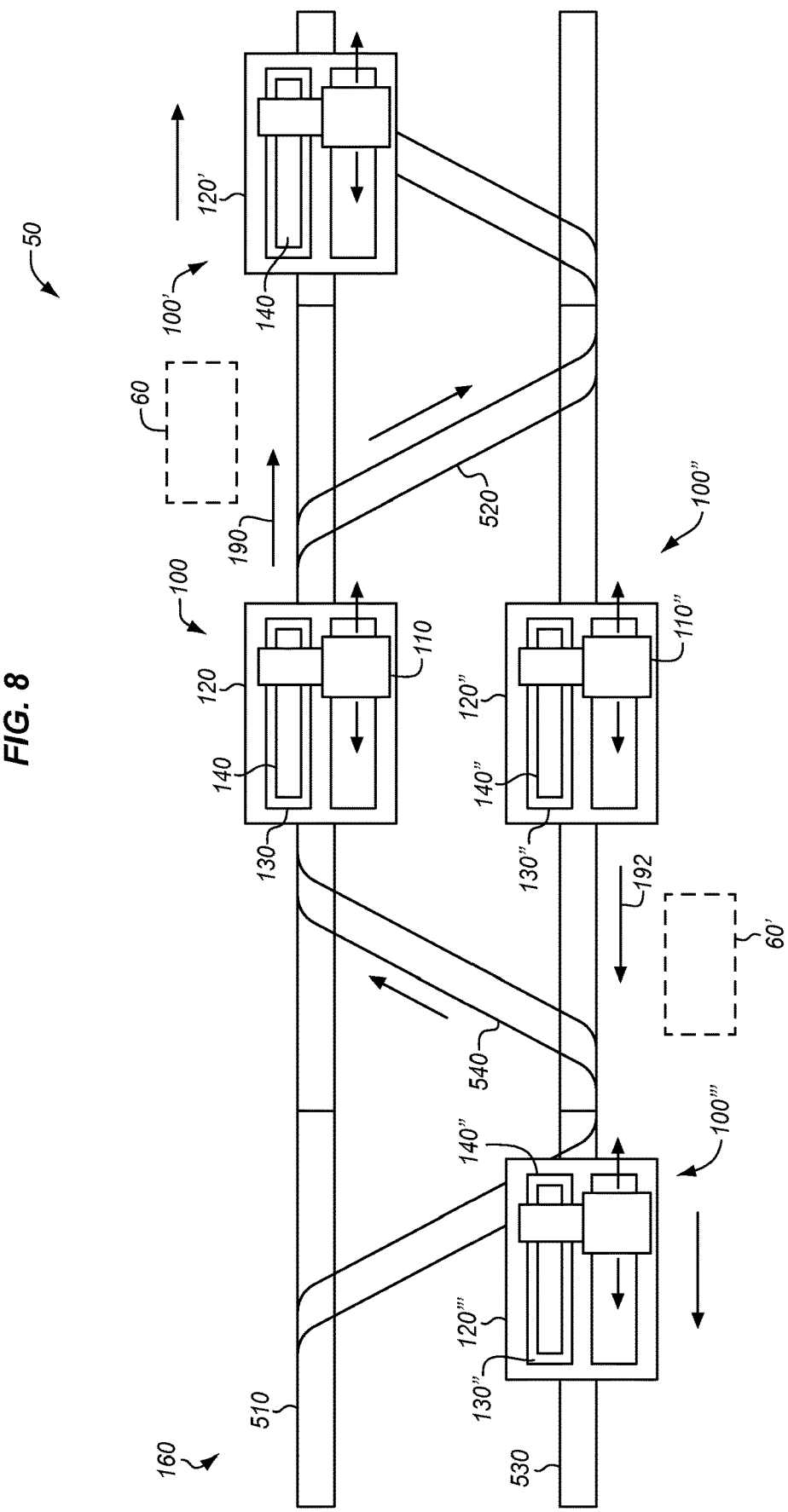
FIG. 8 is a top view of top view of multiple lamination stations that fabricate laminates in two directions in an illustrative embodiment.

FIG. 8 is a top view of top view of the lamination system 50 having multiple lamination stations 100, 100', 100", 100''' that fabricate laminates 140 in two directions 190 and 192 in an illustrative embodiment. Embodiments that utilize multiple lamination stations 100, working in two directions 190, 192 provide a technical benefit by enhancing throughput and/or ensuring that work is performed during all movements of the lamination stations 100. Further, each of the lamination stations 100 can operate on the same track system 160 or at least one of the lamination stations 100 operates on a separate track system or AGV. Each of the first lamination station 100, the second lamination station 100', the third lamination station 100", and a fourth lamination station 100''' include at least some similar components to perform similar lamination processes simultaneously to form respective laminate 140. Alternatively, lamination stations 100 on the same track, first track 510 or second track 530 of the track system 160 work together to perform different parts of the composite fabrication process to form a laminate 140 or 140". The laminates 140 and 140" can be the same type or different types of laminates. In such an embodiment, the lamination stations 100 can be similarly configured with end effectors 115 capable of performing multiple different composite fabrication processes and/or forming more than one type of laminate.

According to FIG. 8, the shuttle 120 of the first lamination station 100 and the second shuttle 120' operate to layup a first laminate 140 while proceeding rightward along the first track 510. Third shuttle 120" of the third lamination station 100" and the fourth shuttle 120''' of the fourth lamination station 100''' operate to layup a second laminate 140" while proceeding leftward along the second track 530. The shuttles 120 and 120" move in a loop from the first track 510, to the first switch track 520, to the second track 530, to the second switch track 540, and back to the first track 510.

The first lamination station 100 operates the lamination machine 110 to place the first laminate 140 onto the layup mandrel 130, and third lamination station 100" operates a lamination machine 110" to place the second laminate 140" onto a mandrel 130". The first laminate 140 is transferred from the shuttle 120 to the second shuttle 120' (e.g., using the transfer machine 60) and proceeds rightward (e.g., in the process direction 190), while second laminate 140" is transferred from the third shuttle 120" to the fourth shuttle 120''' (e.g., using a second transfer machine 60'), and proceeds leftward (e.g., in the counter process direction 192). In this manner, by operating iteratively, the lamination stations 100, 100', 100", 100''' can fabricate two separate types of laminates 140, 140' along the process direction 190 and an opposite, counter process direction 192.

Illustrative details of the operation of the lamination system 50 and the lamination station 100 will be discussed with regard to FIG. 9. Assume, for this embodiment, that a layup mandrel 130 is disposed proximate to shuttle 120 within reach of end effector 115, such as within reach of an actuated arm of the end effector 115.

Figure 9:
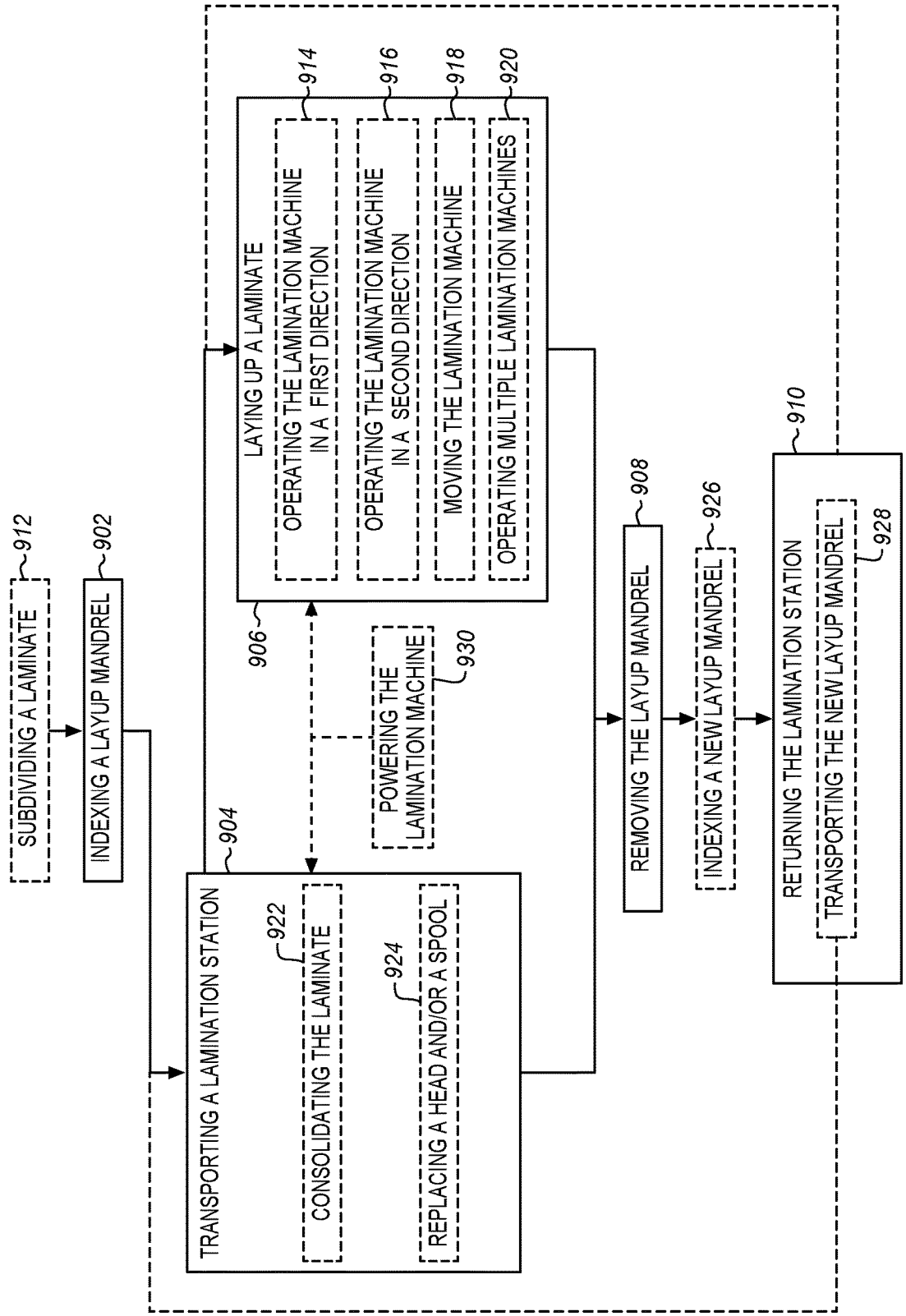
FIG. 9 is a flowchart illustrating a method for operating the lamination system and the lamination station shown in FIGS. 1 to 8.

FIG. 9 is a flowchart illustrating a method 900 for operating the lamination system 50 and the lamination station 100 shown in FIGS. 1 to 8 to form the laminate 140. The steps of method 900 are described with reference to the lamination station 100, but those skilled in the art will appreciate that method 900 may be performed in other systems. The steps of the flowcharts described herein are not all inclusive and may include other steps not shown. The steps described herein may also be performed in an alternative order.

Referring to FIGS. 1, 2, and 9, the method 900 includes indexing 902 the layup mandrel 130, transporting 904 the lamination station 100 and the layup mandrel 130, and laying up 906 the laminate 140 onto the layup mandrel 130 via the lamination machine 110. The method 900 further includes removing 908 the layup mandrel 130 and the laminate 140 and returning the lamination station 100 to the first location 102.

When the lamination system 50 is configured as in FIG. 5, the method 900 can start by subdividing 912 the laminate 140 into portions 580, 582, 584, and/or 586. The indexing 902, transporting 904, laying up 906, removing 908, and returning 910 are performed independently at each of multiple lamination machines 110, 570 arranged along the process direction 190. Each of the multiple lamination machines 110, 570 forms one of the portions 580, 582, 584, and/or 586 of the laminate 140. In one embodiment, the laminate 140 is subdivided 912 into portions 580, 582, 584, and/or 586 (e.g., lengthwise portions, specific subsets of layers, etc.), and the indexing 902, transporting 904, laying up 906, removing 908, and returning 910 is performed independently at each of multiple lamination machines 110, 110' and/or multiple lamination stations 100, 100' arranged along the process direction 190. Each of the multiple lamination machines 110, 110' lays up 906 one of the portions 580, 582, 584, and/or 586 of the laminate 140 that was subdivided 912, and the in-process laminate 140 is handed-off between the lamination machines 110, 110'.

In indexing 902, the layup mandrel 130 is indexed to the lamination station 100. More specifically, the layup mandrel 130 is indexed 902 to the shuttle 120 of the lamination station 100 while the lamination station 100 is at a first location 102 (e.g., a left side of the track system 160). Indexing 902 the layup mandrel 130 to the lamination station 100 also indexes the layup mandrel 130 to the lamination machine 110. Indexing 902 the layup mandrel 130 to the lamination machine 110 happens when the layup mandrel 130 is indexed to the shuttle 120, on which the lamination machine 110 is disposed. Indexing 902 the layup mandrel 130 to the lamination machine 110 includes indexing the layup mandrel 130 to the shuttle 120 via mandrel indexing elements 132 and shuttle indexing elements 122 disposed at the layup mandrel 130 and the shuttle 120.

Indexing 902 the layup mandrel 130 may include lifting or sliding the layup mandrel 130 into a position wherein the mandrel indexing elements 132 align and/or engage with the shuttle indexing elements 122. The indexing 902 may be performed by an actuated arm (e.g., the kinematic chain 114 and the end effector 115 of the lamination machine 110, or another robot arm outside of the lamination station 100) picking up and placing the layup mandrel 130 into position on the shuttle 120 based on instructions in an NC program. In a further embodiment, pick up by a robot is not necessary, as joining via indexing 902 may occur where a platform track and a mandrel track intersect and shuttle indexing elements 122 and mandrel indexing element 132 align and/or engage.

In transporting 904, the lamination machine 110 and the layup mandrel 130 are transported in the process direction 190 from the first location 102 towards a second location 104 (e.g., a final location at a right side of the track system 160 when viewing the figures). For example, the shuttle 120 is driven in the process direction 190 to transport 904 the lamination machine 110 and the layup mandrel 130. To perform the transport 904 operation, the controller 112 may direct the drive system 150 to move the shuttle 120 along the track system 160 at a desired rate of speed. In embodiments where the drive system 150 comprises an AGV, the drive system 150 may be independently operated by another controller. In embodiments where the drive system 150 comprises a chain drive, a mechanical coupling 440 (shown in FIG. 4) at the shuttle 120 may engage with the chain drive in order to transport 904 the shuttle 120 at the desired rate of speed. In examples of the lamination system 50 as shown in FIGS. 6 to 8, shuttles 120 at each of multiple lamination station 100 may be transported via the drive system 150 in order to ensure that the lamination station 100 operate at a uniform rate of speed.

In laying up 906, the lamination machine 110 lays up the laminate 140 having layers 141, 142 of fiber-reinforced material 147 onto the layup mandrel 130. In the exemplary embodiment, the laying up 906 occurs while the lamination station 100 and the layup mandrel 130 are transported 904 in the process direction 190. When the lamination system 50 is configured as in FIG. 8, the transporting 904 and laying up 906 are also performed when the lamination station 100 and the layup mandrel 130 are moving in the counter process direction 192. Laying up 906 includes laying the first layer 141 on to the layup mandrel 130, laying the second layer 142 on the first layer 141, and so on until the layers of the laminate 140 are laid up 906 on the layup mandrel 130.

In one embodiment, laying up 906 the laminate 140 includes operating 914 the lamination machine 110 in the first direction 322 in the process direction 190 to lay up 906 the first layer 141 and operating 916 the lamination machine 110 in the second direction 324 opposed to the process direction 190 to lay up 906 the second layer 142. The operating steps 914, 916 are repeated to add more layers to build up the laminate 140. That is, during laying up 906 the lamination machine 110 moves 918 independently of the process direction 190 and may move in any suitable direction to perform laying up 906.

Laying up 906 the laminate 140 includes moving 918 the lamination machine 110 independently of the process direction 190. More specifically, the lamination machine 110 is moved 918 independently of the direction the shuttle 120 of the lamination station 100 moves because the lamination machine 110 moves 918 along the path 318 with respect to the shuttle 120, as described in more detail with respect to FIG. 3.

When the lamination system 50 includes multiple lamination machines 110, 570 as shown in FIG. 5, laying up 906 the laminate 140 includes operating 920 the multiple lamination machines 110, 570 simultaneously to apply the layers 141, 142 of the fiber-reinforced material 147 onto the layup mandrel 130.

Because the layup mandrel 130 is indexed 902 to the shuttle 120, and because the lamination machine 110 is affixed to the shuttle 120, any offset between the lamination machine 110 and the layup mandrel 130 is known. This means that, regardless of the location of the shuttle 120 along the track system 160, the lamination machine 110 continues to operate in accordance with an NC program without interruption.

Referring again to transporting 904, in a further embodiment, the end effector 115 consolidates 922 the laminate 140 while the lamination station 100 and the layup mandrel 130 are transported 904 in the process direction 190 (and/or the counter process direction 192 when the lamination system 50 is configured as in FIG. 8). The consolidation 922 is performed by applying pressure to the laminate 140 while the lamination station 100 and the layup mandrel 130 are transported 904 in the process direction 190 (and/or the counter process direction 192 when the lamination system 50 is configured as in FIG. 8). The rate of transportation 904 of the shuttle 120 may be any desired speed, such as a tenth of one mile per hour (0.05 meters per second), or other speeds.

During laying up 906, the spool 117 at the head 116 may run out of fiber-reinforced material 147 or the lamination machine 110 may be programmed to perform a subsequent process using a different head. In such instances, the method 900 includes replacing 924 the head 116 and/or the spool 117 during the transporting 904. For example, the head 116 is replaced 924 with the spare head 116' and/or the spool 117 is replaced 924 with the spare spool 117' as the lamination station 100 is transported 904 in the process direction 190 or in the counter process direction 192. In a particular example, the controller 112 may operate the kinematic chain 114 and the end effector 115 to replace 924 the head 116 (or spool 117) of the lamination machine 110 during transport 904. The replacement 924 may include acquiring a spare 119, such as the spare head 116' and/or the spare spool 117', from the shuttle 120, or from a second shuttle 120' traveling at the same speed in the same direction, and/or at an off-shuttle location at a known offset from the shuttle 120 and/or track system 160.

In removing 908, the layup mandrel 130 and the laminate 140 are removed at the second location 104. More specifically, the layup mandrel 130 having the laminate 140 thereon is removed 908 from the lamination station 100 at the second location 104. In one embodiment, the removing 908 includes operating a robot arm (e.g., at the lamination machine 110) and/or the transfer machine 60 to move the layup mandrel 130 (and hence the laminate 140) from the lamination station 100 to another station in the lamination system 50 or in the manufacturing line 10. The other station may lay up 906 another portion of the laminate 140, may consolidate 922 the laminate 140 by applying pressure, may apply a vacuum bag 640 to the laminate 140, or may even cure the laminate 140 via the application of heat.

In returning 910, the lamination station 100 is returned to the first location 102 for forming an additional laminate 140' onto a new layup mandrel 130'. For example, the lamination machine 110 is carried upon the shuttle 120, which is transported 928 along the track system 160 (such as along parallel tracks 510, 530, 560) to return 910 to the first location 102. In one embodiment, the track system 160 forms a loop, or includes switch tracks 520, 540 for ferrying the shuttle 120 to a return track, such as the second track 530. In this manner, multiple shuttles 120, 120' may consistently travel back and forth between the first location 102 and the second location 104 without interfering with each other.

In one embodiment, before or while returning 910 on a loop, the new layup mandrel 130' is indexed 926 to the lamination station 100. The indexing 926 of the new layup mandrel 130' is similar to the indexing 902 of the first layup mandrel 130. For example, mandrel indexing elements 132 of the new layup mandrel 130' are aligned and/or engaged with the shuttle indexing elements 122 to index 926 the new layup mandrel 130' to the shuttle 120. In a particular example, the new layup mandrel 130' is indexed 926 to the lamination machine 110 while the lamination station 100 is at the second location 104.

When the lamination station 100 is provided the new layup mandrel 130', the lamination machine 110 can continue to perform the laying up 906 to form the additional laminate 140' on the new layup mandrel 130'. In such an embodiment, after removing 908 the first layup mandrel 130, the lamination station 100 and the new layup mandrel 130' are transported 928 in the counter process direction 192, opposed to the process direction 190, from the second location 104 towards the first location 102. The lamination machine 110 lays up 906 the additional laminate 140' having layers 141, 142 of fiber-reinforced material 147 onto the new layup mandrel 130' while the lamination station 100 and the new layup mandrel 130' are transported 928 opposed to the process direction 190. The transporting 928 in the counter process direction 192 can be substantially similar to the transporting 904 described above. For example, the laying up 906, consolidation 922, and/or replacement 924 can occur during the transporting 928 in the counter process direction 192.

For the lamination machine 110 to perform the steps of method 900, the lamination machine 110 is powered 930. More specifically, the lamination machine 110 is powered 930 by the power supply 170 disposed at the shuttle 120. Additionally or alternatively, the lamination machine 110 is powered 930 via the powered rail 162 along which the lamination station 100 travels during the transporting 904. The powering 930 occurs at least during laying up 906 and can also occur during the transporting 904 (e.g., to perform the consolidation 922 and/or replacement 924) or any other step of the method 900 where the lamination machine 110 is performing an action or is in an inactive, but ready, state.

Method 900 provides an advantage over prior systems and techniques because the method 900 can enable continuous, in-line fabrication techniques to be applied to composite parts, such as stringers or frames of an aircraft (e.g., the aircraft 1002 shown in FIG. 11), while laminates for those parts are in motion through the manufacturing line 10 (shown in FIG. 1). Furthermore, the method 900 does not require specialized, heavy machinery such as an AFP machine. Hence, if one lamination machine 110 requires maintenance during the performance of method 900, the lamination machine 110, end effector 115, head 116, or spool 117 may be rapidly replaced by a technician (or another AFP machine) without disrupting the fabrication process.

EXAMPLES

In the following examples, additional processes, systems, and methods are described in the context of continuous-line fabrication process for composite parts.

Figure 10:
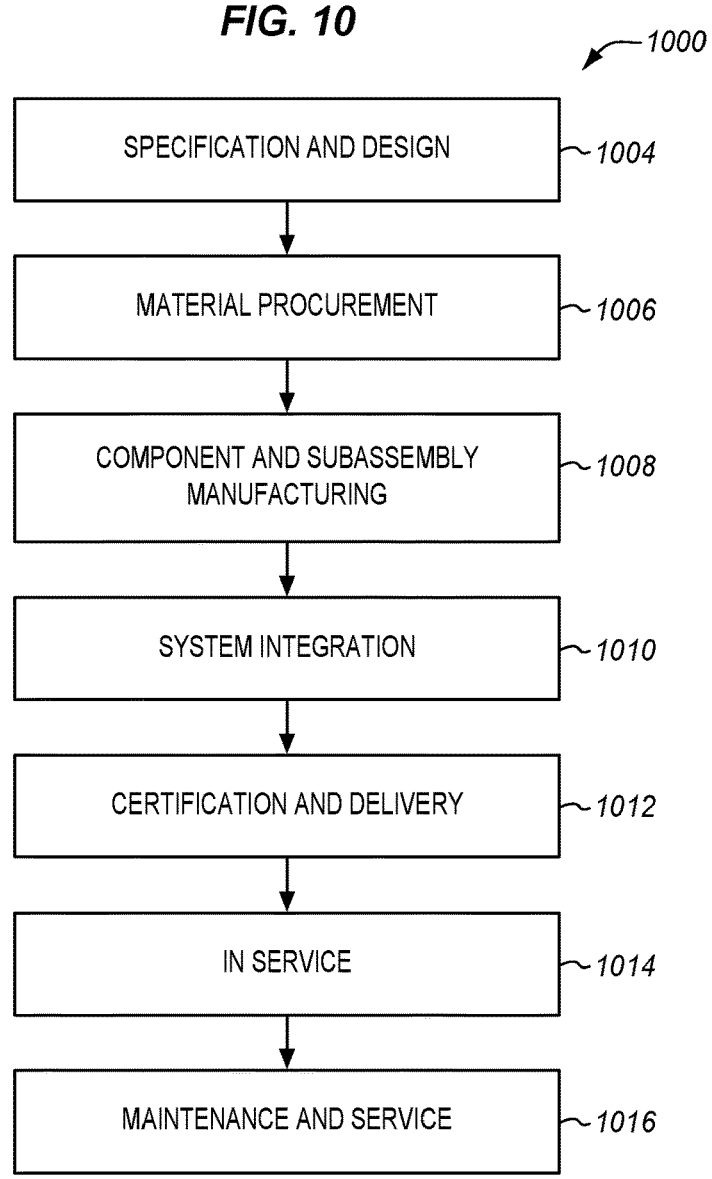
FIG. 10 is a flow diagram of aircraft production and service methodology in which the lamination station of FIGS. 1 to 8 and/or the method of FIG. 9 can be used.
Figure 11:
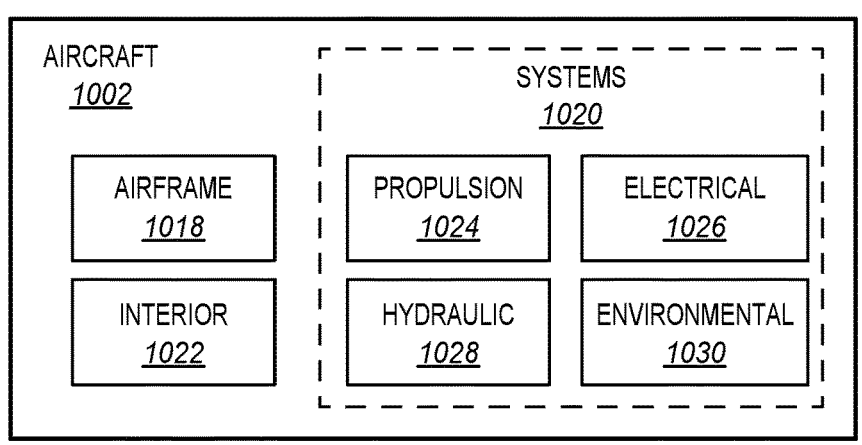
FIG. 11 is a block diagram of an aircraft that can be manufacturing using the lamination station of FIGS. 1 to 8 and/or the method(s) of FIGS. 9 and 10.

Referring more particularly to the drawings, embodiments of the disclosure may be described in the context of aircraft manufacturing and service in method 1000 as shown in FIG. 10 and an aircraft 1002 as shown in FIG. 11. During pre-production, method 1000 may include specification and design 1004 of the aircraft 1002 and material procurement 1006. During production, component and subassembly manufacturing 1008 and system integration 1010 of the aircraft 1002 takes place. The method 900 (shown in FIG. 9) may be performed during the component and subassembly manufacturing 1008 to produce a portion of the aircraft 1002. Thereafter, the aircraft 1002 may go through certification and delivery 1012 in order to be placed in service 1014. While in service by a customer, the aircraft 1002 is scheduled for routine work in maintenance and service 1016 (which may also include modification, reconfiguration, refurbishment, and so on).

Systems and methods embodied herein may be employed during any one or more suitable stages of the production and service described in method 1000 (e.g., specification and design 1004, material procurement 1006, component and subassembly manufacturing 1008, system integration 1010, certification and delivery 1012, service 1014, maintenance and service 1016) and/or to produce any suitable component of aircraft 1002 (e.g., airframe 1018, systems 1020, interior 1022, propulsion system 1024, electrical system 1026, hydraulic system 1028, environmental system 1030).

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 1002 produced by method 1000 may include an airframe 1018 with a plurality of systems 1020 and an interior 1022. Examples of systems 1020 include one or more of a propulsion system 1024, an electrical system 1026, a hydraulic system 1028, and an environmental system 1030. Any number of other systems may be included. Although an aerospace example is shown, the principles of the disclosure may be applied to other industries, such as the automotive industry.

As already mentioned above, lamination systems 50 and methods 900 (shown in FIG. 109) embodied herein may be employed during any one or more of the stages of the production and service described in method 1000. For example, components or subassemblies corresponding to component and subassembly manufacturing 1008 may be fabricated or manufactured in a manner similar to components or subassemblies produced while the aircraft 1002 is in service. Also, one or more system embodiments, method embodiments, or a combination thereof may be utilized during the subassembly manufacturing 1008 and system integration 1010, for example, by substantially expediting assembly of or reducing the cost of an aircraft 1002.

Similarly, one or more of system embodiments, method embodiments, or a combination thereof may be utilized while the aircraft 1002 is in service, for example and without limitation during the maintenance and service 1016. For example, the method 900 and lamination system 50 described herein may be used for material procurement 1006, component and subassembly manufacturing 1008, system integration 1010, service 1014, and/or maintenance and service 1016, and/or may be used for airframe 1018 and/or interior 1022. These method 900 and lamination system 50 may even be utilized to create any suitable part for the systems 1020, including, for example, propulsion system 1024, electrical system 1026, hydraulic system 1028, and/or environmental system 1030.

In one embodiment, a part comprises a portion of airframe 1018 and is manufactured during component and subassembly manufacturing 1008 using the method 900 and the lamination system 50. The part may then be assembled into the aircraft 1002 in system integration 1010, and then be utilized in service 1014 until the part is to be replaced. Then, in maintenance and service 1016, the part may be discarded and replaced with a newly manufactured part made using any suitable method, such as the method 900. Inventive systems and methods may be utilized throughout component and subassembly manufacturing 1008 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for forming a laminate, the method comprising:
 indexing a layup mandrel to a lamination station disposed at a first location;
 transporting the lamination station and the layup mandrel in a process direction from the first location towards a second location;
 laying up the laminate having layers of fiber-reinforced material onto the layup mandrel via a lamination machine while the lamination machine and the layup mandrel are transported in the process direction;
 removing the layup mandrel and the laminate at the second location; and
 returning the lamination station to the first location for laying up an additional laminate onto a new layup mandrel.

2. The method of claim 1 wherein:
 the lamination machine is disposed on a shuttle that is driven in the process direction, and
 indexing the layup mandrel to the lamination station comprises indexing the layup mandrel to the shuttle via complementary indexing elements disposed at the layup mandrel and the shuttle.

3. The method of claim 1 wherein:
laying up the laminate comprises moving the lamination machine independently of the process direction.

4. The method of claim 2 further comprising:
powering the lamination machine via a power supply disposed at the shuttle.

5. The method of claim 1 further comprising:
powering the lamination machine via a powered rail along which the lamination station travels during the transporting.

6. The method of claim 1 further comprising:
replacing a head of the lamination machine during the transporting.

7. The method of claim 1 further comprising:
replacing a spool of the lamination machine during the transporting.

8. The method of claim 1, wherein the lamination station includes multiple lamination machines, the method further comprising:
subdividing the laminate into portions; and
performing the indexing, transporting, laying up, removing, and returning independently at each of the multiple lamination machines arranged along the process direction, wherein each of the multiple lamination machines forms one of the portions of the laminate.

9. The method of claim 8, wherein the lamination station includes multiple lamination machines and:
laying up the laminate comprises operating the multiple lamination machines simultaneously to apply layers of fiber-reinforced material onto the layup mandrel.

10. The method of claim 1 further comprising:
consolidating the laminate while the lamination station and the layup mandrel are transported in the process direction.

11. The method of claim 1 wherein:
laying up the laminate comprises operating the lamination machine in the process direction to lay up a first layer, and operating the lamination machine in a second direction opposed to the process direction to lay up a second layer.

12. The method of claim 1 further comprising:
indexing the new layup mandrel to the lamination station;
transporting the lamination station and the new layup mandrel in a counter process direction opposed to the process direction from the second location towards the first location; and
laying up an additional laminate comprising layers of fiber-reinforced material on to the new layup mandrel via the lamination machine while the lamination station and the new layup mandrel are transported in the counter process direction.

13. A non-transitory computer readable medium embodying programmed instructions which, when executed by a processor, are operable for performing a method for forming a laminate, the method comprising:
indexing a layup mandrel to a lamination station disposed at a first location;
transporting the lamination station and the layup mandrel in a process direction from the first location towards a second location;
laying up the laminate having multiple layers of fiber-reinforced material onto the layup mandrel via a lamination machine while the lamination station and the layup mandrel are transported in the process direction;
removing the layup mandrel and the laminate at the second location; and
returning the lamination station to the first location for laying up an additional laminate onto a new layup mandrel.

14. A lamination system for forming a laminate having multiple layers of fiber-reinforced material, the lamination system comprising:
a layup mandrel having mandrel indexing elements;
a lamination station comprising:
a shuttle comprising shuttle indexing elements for engaging the mandrel indexing elements of the layup mandrel; and
a lamination machine attached to the shuttle; and
a drive system that transports the shuttle in a process direction while the lamination machine lays up the layers of the laminate onto the layup mandrel.

15. The lamination system of claim 14 further comprising:
a transfer machine that transports the layup mandrel from the lamination station to another lamination station after the laminate has been laid-up.

16. The lamination system of claim 15 wherein:
the transfer machine includes arms that insert into the layup mandrel.

17. The lamination system of claim 14 wherein:
the shuttle includes a power supply and a gas supply that enable the lamination machine to operate while the drive system transports the shuttle.

18. The lamination system of claim 14 wherein:
the drive system comprises a powered rail along which the drive system transports the shuttle; and
the shuttle includes an interface that couples with the powered rail.

19. The lamination system of claim 14 wherein:
the drive system comprises an Autonomous Guided Vehicle.

20. The lamination system of claim 14 wherein:
the drive system comprises a chain drive that is coupled with the shuttle.

21. The lamination system of claim 14 wherein:
the shuttle includes at least one of a spare head and a spare spool for the lamination machine.

22. The lamination system of claim 14 wherein:
the lamination station lays up a portion of the laminate, and
the lamination system further comprises an additional lamination station that lays up an additional portion of the laminate, and the lamination system is configured to transfer the layup mandrel from the lamination station to the additional lamination station.

23. The lamination system of claim 14 wherein:
the lamination machine is configured to lay up multiple layers of the laminate while being transported in the process direction.

24. The lamination system of claim 14 further comprising:
a second shuttle comprising a second lamination machine, wherein the lamination machine and the second lamination machine are configured to lay up the laminate via coordinated action.

25. The lamination system of claim 14 wherein:
the shuttle indexing elements comprise cups, and the mandrel indexing elements comprise cones.

26. A method for forming a laminate, the method comprising:
indexing a layup mandrel to a lamination station disposed at a first location;
transporting the lamination station and the layup mandrel in a process direction from the first location towards a second location;

consolidating the laminate while the lamination station and the layup mandrel are transported in the process direction;

laying up the laminate having layers of fiber-reinforced material onto the layup mandrel via a lamination machine by operating the lamination machine in the process direction to lay up a first layer and operating the lamination machine in a second direction opposed to the process direction to lay up a second layer while the lamination machine and the layup mandrel are transported in the process direction, wherein the lamination machine is disposed on a shuttle that is driven in the process direction, and wherein indexing the layup mandrel to the lamination station comprises indexing the layup mandrel to the shuttle via complementary indexing elements disposed at the layup mandrel and the shuttle;

powering the lamination machine via a power supply disposed at the shuttle or via a powered rail along which the lamination station travels during the transporting;

removing the layup mandrel and the laminate at the second location;

returning the lamination station to the first location for laying up an additional laminate onto a new layup mandrel;

indexing the new layup mandrel to the lamination station;

transporting the lamination station and the new layup mandrel in a counter process direction opposed to the process direction from the second location towards the first location; and laying up an additional laminate comprising layers of fiber-reinforced material on to the new layup mandrel via the lamination machine while the lamination station and the new layup mandrel are transported in the counter process direction.

27. A non-transitory computer readable medium embodying programmed instructions which, when executed by a processor, are operable for performing a method for forming a laminate, the method comprising:

indexing a layup mandrel to a lamination station disposed at a first location;

consolidating the laminate while the lamination station and the layup mandrel are transported in the process direction;

transporting the lamination station and the layup mandrel in a process direction from the first location towards a second location;

laying up the laminate having multiple layers of fiber-reinforced material onto the layup mandrel via a lamination machine by operating the lamination machine in the process direction to lay up a first layer, and operating the lamination machine is a second direction opposed to the process direction to lay up a second layer while the lamination station and the layup mandrel are transported in the process direction, wherein the lamination machine is disposed on a shuttle that is driven in the process direction, and wherein indexing the layup mandrel to the lamination station comprises indexing the layup mandrel to the shuttle via complementary indexing elements disposed at the layup mandrel and the shuttle;

powering the lamination machine via a power supply disposed at the shuttle or via a powered rail along which the lamination station travels during the transporting;

removing the layup mandrel and the laminate at the second location;

returning the lamination station to the first location for laying up an additional laminate onto a new layup mandrel;

indexing the new layup mandrel to the lamination station;

transporting the lamination station and the new layup mandrel in a counter process direction opposed to the process direction from the second location towards the first location; and laying up the additional laminate having layers of fiber-reinforced material onto the new layup mandrel via the lamination machine while the lamination station and the new layup mandrel are transported in the counter process direction.

28. A lamination system for forming a laminate having multiple layers of fiber-reinforced material, the lamination system comprising:

a layup mandrel having mandrel indexing elements;

a lamination station comprising:
 a shuttle comprising shuttle indexing elements for engaging the mandrel indexing elements of the layup mandrel, wherein the shuttle indexing elements comprise cups, and the mandrel indexing elements comprise cones;
 a lamination machine attached to the shuttle, wherein the lamination machine is configured to lay up multiple layers of the laminate while being transported in a process direction, and wherein the shuttle includes at least one of a spare head and a spare spool for the lamination machine;
 a second shuttle comprising a second lamination machine, wherein the lamination machine and the second lamination machine are configured to lay up the laminate via coordinated action a drive system that transports the shuttle in the process direction while the lamination machine lays up the layers of the laminate onto the layup mandrel, wherein the shuttle includes a power supply and a gas supply that enable the lamination machine to operate while the drive system transports the shuttle, wherein the drive system comprises a chain drive that is coupled with the shuttle and a powered rail along which the drive system transports the shuttle and the shuttle includes an interface that couples with the powered rail; and a transfer machine that transports the layup mandrel from the lamination station to another lamination station after the laminate has been laid-up, wherein the transfer machine includes arms that insert into the layup mandrel.

* * * * *